US008626361B2

(12) United States Patent
Gerlock

(10) Patent No.: US 8,626,361 B2

(45) Date of Patent: Jan. 7, 2014

(54) SYSTEM AND METHODS FOR UNMANNED AERIAL VEHICLE NAVIGATION

(75) Inventor: Derick Lucas Gerlock, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1039 days.

(21) Appl. No.: 12/323,069

(22) Filed: Nov. 25, 2008

(65) Prior Publication Data

US 2010/0131121 A1 May 27, 2010

(51) Int. Cl.
*G06F 7/00* (2006.01)

(52) U.S. Cl.
USPC .......... 701/14; 701/1; 701/9; 701/13; 701/24; 701/301; 340/991; 340/992; 340/993

(58) Field of Classification Search
USPC ........... 701/1, 9, 14, 23, 24, 25, 26, 301, 302; 340/991, 992, 993
See application file for complete search history.

(56) References Cited

U.S. PATENT DOCUMENTS 6,038,502 A * 3/2000 Sudo ............................... 701/23
6,804,607 B1 * 10/2004 Wood ............................ 701/301
7,307,579 B2 12/2007 Rees et al.
7,706,979 B1 * 4/2010 Herwitz ........................ 701/301
2002/0032528 A1 * 3/2002 Lai ................................ 701/301
2003/0122701 A1 * 7/2003 Tran ................................ 342/29
2005/0055143 A1 * 3/2005 Doane ............................. 701/30
2005/0109872 A1 * 5/2005 Voos et al. ................... 244/3.17
2006/0167598 A1 * 7/2006 Pennarola ........................ 701/11
2006/0253254 A1 * 11/2006 Herwitz ........................ 701/301
2006/0256000 A1 * 11/2006 Larsson et al. .................. 342/30
2006/0287827 A1 * 12/2006 Tran .............................. 701/301
2007/0005247 A1 * 1/2007 Hammarlund et al. ........ 701/301
2007/0210953 A1 * 9/2007 Abraham et al. ............... 342/29
2007/0276553 A1 * 11/2007 Bitar et al. ......................... 701/3
2009/0088972 A1 * 4/2009 Bushnell ....................... 701/210
2009/0118896 A1 * 5/2009 Gustafsson ..................... 701/29

* cited by examiner

*Primary Examiner* — James Trammell
*Assistant Examiner* — Truc M Do
(74) *Attorney, Agent, or Firm* — Shumaker & Sieffert, P.A.

(57) ABSTRACT

A system includes an unmanned aerial vehicle (UAV) configured to be equipped with data representing a first UAV flight plan, and a ground station configured to control the UAV. The ground station is operable to receive, at a first time, a first data set representing at least one flight path of at least one aircraft, calculate a second UAV flight plan to avoid the at least one flight path of the at least one aircraft, the second UAV flight plan being based on the data representing the first UAV flight plan and the first data set representing at least one flight path of the at least one aircraft, and transmit data representing the second UAV flight plan to the UAV.

20 Claims, 4 Drawing Sheets

SYSTEM AND METHODS FOR UNMANNED AERIAL VEHICLE NAVIGATION

BACKGROUND OF THE INVENTION

A UAV is a remotely piloted or self-piloted aircraft that can carry cameras, sensors, communications equipment, or other payloads, is capable of controlled, sustained, level flight, and is usually powered by an engine. A self-piloted UAV may fly autonomously based on preprogrammed flight plans.

UAVs are becoming increasingly used for various missions where manned flight vehicles are not appropriate or not feasible. These missions may include military situations, such as surveillance, reconnaissance, target acquisition, data acquisition, communications relay, decoy, harassment, or supply flights. UAVs are also used for a growing number of civilian missions where a human observer would be at risk, such as firefighting, natural disaster reconnaissance, police observation of civil disturbances or crime scenes, and scientific research. An example of the latter would be observation of weather formations or of a volcano.

As miniaturization technology has improved, it is now possible to manufacture very small UAVs (sometimes referred to as micro-aerial vehicles, or MAVs). For examples of UAV and MAV design and operation, see U.S. patent application Ser. Nos. 11/752,497, 11/753,017, and 12/187,172, all of which are hereby incorporated by reference in their entirety herein.

A UAV can be designed to use a ducted fan for propulsion, and may fly like a helicopter, using a propeller that draws in air through a duct to provide lift. The UAV propeller is preferably enclosed in the duct and is generally driven by a gasoline engine. The UAV may be controlled using micro-electrical mechanical systems (MEMS) electronic sensor technology.

Traditional aircraft may utilize a dihedral wing design, in which the wings exhibit an upward angle from lengthwise axis of the aircraft when the wings are viewed from the front or rear of this axis. A ducted fan UAV may lack a dihedral wing design and, therefore, it may be challenging to determine which direction a ducted fan UAV is flying. Consequently, it can be difficult for both manned and unmanned vehicles to avoid collisions with such a UAV. As UAVs are more widely deployed, the airspace will become more crowded. Thus, there is an increasing need to improve UAV collision avoidance systems.

However, there currently exist a number of UAVs that are too small to carry the sensors required to perform on-board collision avoidance.

SUMMARY OF THE INVENTION

In an embodiment, a system includes an unmanned aerial vehicle (UAV) configured to be equipped with data representing a first UAV flight plan, and a ground station configured to control the UAV. The ground station is operable to receive, at a first time, a first data set representing at least one flight path of at least one aircraft, calculate a second UAV flight plan to avoid the at least one flight path of the at least one aircraft, the second UAV flight plan being based on the data representing the first UAV flight plan and the first data set representing at least one flight path of the at least one aircraft, and transmit data representing the second UAV flight plan to the UAV.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
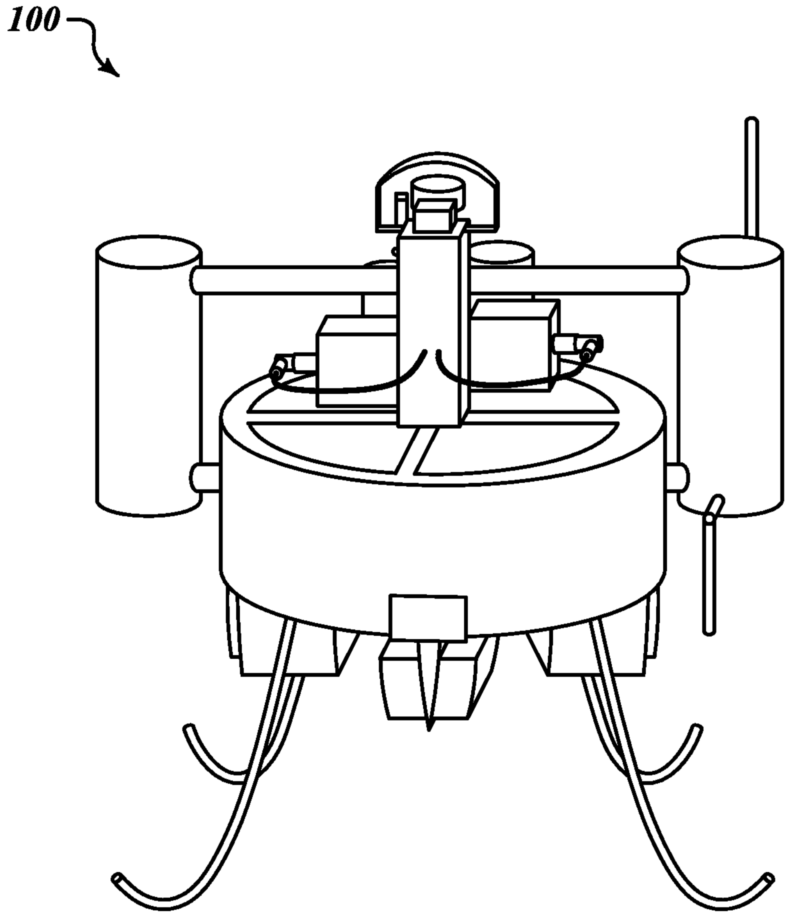
FIG. 1 illustrates an exemplary UAV design in accordance with an embodiment of the present invention.

FIG. 1 depicts an exemplary UAV 100. UAV 100 may be used for reconnaissance, surveillance and target acquisition (RSTA) missions. For example, UAV 100 may launch and execute an RSTA mission by flying to one or more waypoints according to a flight plan before arriving at a landing position. Once launched, UAV 100 can perform such a UAV flight plan autonomously or with varying degrees of remote operator guidance from one or more ground control stations ("ground station"). UAV 100 may be a hovering ducted fan UAV, but alternative UAV embodiments can also be used.

UAV 100 may include one or more active or passive sensors, such as a video camera or an acoustic sensor. In alternative embodiments, different types of sensors may be used in addition to the video camera and/or the acoustic sensor, such as motion sensors, heat sensors, wind sensors, RADAR, LADAR, electro-optical (EO), non-visible-light sensors (e.g. infrared (IR) sensors), and/or EO/IR sensors. Furthermore, multiple types of sensors may be utilized in conjunction with one another in accordance with multi-modal navigation logic. Different types of sensors may be used depending on the characteristics of the intended UAV mission and the environment in which the UAV is expected to operate.

UAV 100 may also comprise a processor and a memory coupled to these sensors and other input devices. The memory is preferably configured to contain static and/or dynamic data, including the UAV's flight plan, flight corridors, flight paths, terrain maps, and other navigational information. The memory may also contain program instructions, executable by the processor, to conduct flight operations, and other operations, in accordance with the methods disclosed herein.

Generally speaking, UAV 100 may be programmed with a UAV flight plan that instructs UAV 100 to fly between a number of waypoints in a particular order, while avoiding certain geographical coordinates, locations, or obstacles. For example, if UAV 100 is flying in the vicinity of a commercial, civilian or military flight corridor, UAV 100 should avoid flying in this corridor during the flight corridor's hours of operation. Similarly, if UAV 100 is programmed with a flight path of a manned aircraft or another UAV, UAV 100 should adjust its UAV flight plan avoid this flight path. Additionally, if UAV 100 is flying according to its UAV flight plan and UAV 100 encounters a known or previously unknown obstacle, UAV 100 should adjust its UAV flight plan to avoid the obstacle.

Herein, the term "flight plan" generally refers to the planned path of flight of a UAV, such as UAV 100, while the term "flight path" generally refers to an observed or planned path of flight of another aerial vehicle that the UAV may encounter. However, these terms may otherwise be used interchangeably.

Figure 2:
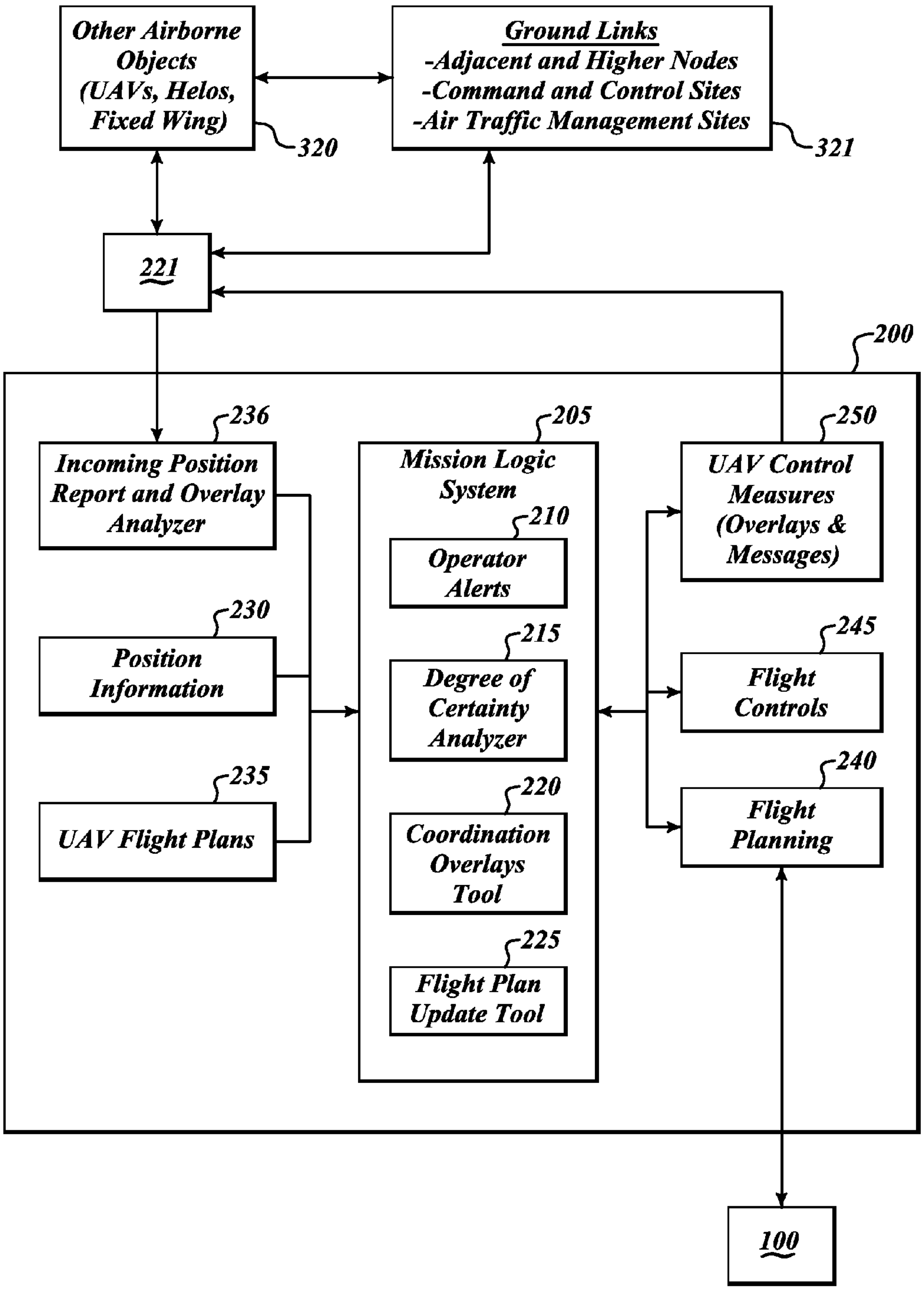
FIG. 2 illustrates an exemplary operating environment and system in accordance with an embodiment of the present invention.

FIG. 2 illustrates an example of a suitable operating environment, such as a ground station 200, in which an embodiment of the invention may be implemented. The operating environment is only one example of a suitable operating environment and is not intended to suggest any limitation as to the scope of use or functionality of the invention. Well known computing systems, environments, and/or configurations that may be suitable for use with the invention include, but are not limited to, personal computers, server computers, hand-held, wearable computing systems, laptop devices, multiprocessor systems, microprocessor-based systems, programmable consumer electronics, network PCs, minicomputers, mainframe computers, or distributed computing environments that include any of the above systems or devices, and the like.

Embodiments of the invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The operating environment illustrated in FIG. 2 typically includes at least some form of computer readable media. Computer readable media can be any available media that can be accessed by one or more components of such operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by one or more components of such operating environment. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Referring to FIG. 2, illustrated in the form of a functional block diagram are modules executable by, and storable on at least one computer readable medium associated with or otherwise accessible to, a ground station 200. The illustrated embodiment includes a mission logic system 205, which in turn includes an operator-alerts module 210, a degree-of-certainty-analyzer (DOC) module 215, an overlays tool 220, and a flight-plan-update tool 225. The structure and function of the modules included by the mission logic system 205, and principles under which they operate, incorporate concepts described in commonly owned U.S. Patent Application Publication No. 2009/0077214, which was filed on Sep. 17, 2007 and is entitled, "System for Fusing Information from Assets, Networks, and Automated Behaviors"; U.S. Pat. No. 8,543,265, which issued on Sep. 24, 2013 and is entitled, "Systems and Methods for Unmanned Aerial Vehicle Navigation" and U.S. Patent Application Publication No. 2009/0138521, which was filed on Sep. 17, 2007 and is entitled, "Method and System for Sharing Information Between Disparate Data Sources In A Network", which are hereby incorporated by reference as if fully set forth herein.

In an embodiment, the station 200 receives, via one or more radios 221, digital flight-path and/or position reports from airborne objects (AOs) 320, which could be other UAVs, helicopters, fixed wing aircraft, or balloons and other lighter than air aircraft. These reports may include, for example, position, heading, altitude, and velocity of the AO 320.

A report/overlay (R/O) analyzer 236 is configured to process the AO flight-path reports and compare the information associated with the reports to current-position information 230 and future flight plans 235 of one or more UAVs 100 under the control of the station 200. This comparison may generate one or more overlays of the projected respective positions of the controlled UAVs 100 and the AOs to enable a determination of potential flight-path conflicts.

The alerts module 210 is configured to provide instant alerts (e.g., auditory and/or displayed to a display device (not shown) associated with the station 200) to the operator of the station 200 in response to a determination by the R/O analyzer 236 that one or more of the controlled UAVs 100 will be positioned within a user-configurable or pre-defined thresholds proximity of one or more of the AOs 320. The pre-defined thresholds can be based on standards or other regulations.

The DOC module 215 is configured to calculate the degree of certainty resulting from the incoming flight-path reports. For example, the station 200 may be configured to receive a series of reports from the AOs over a period of time for purposes of updating the flight paths of such AOs. If the station 200 fails to receive a report of the series, either through station malfunction or a communication failure on the part of an AO, the DOC module 215 can calculate an estimate of the AO's flight path based on the last report received from the AO. Additionally, the mission logic system 205 can notify the operator that the certainty of the position analysis is reduced and that manual operation of the controlled UAVs 100 should be resumed. The station 200 can also provide a displayed estimated flight path of the AO on an associated display device. The station 200 can also provide a maximum possible radius marker of the AO that is based on last known position augmented with information such as predicted location based on last known heading and speed information.

The overlays tool 220 is configured to generate "control measure" overlays representing the flight paths of the AOs in order to enable construction by the update tool 225 of flight plans for the controlled UAVs 100 and to ensure that the operator does not plan a controlled-UAV route or manually direct a controlled UAV into a position in conflict with an actual or potential AO position or is at least notified of a potential conflict requiring additional coordination on the part of the UAV operator.

The update tool 225 takes into account all the information from the other modules of the mission logic system 205, as well as the current position of controlled UAVs 100, current flight plans of controlled UAVs, and incoming AO reports, and automatically updates the controlled-UAV flight plans to avoid collisions with AOs.

The flight planning module 240 and flight control module 245 are configured to communicate with the controlled UAVs 100 to upload safe, non-conflicting flight plans, and uploads these new flight plans when the mission logic system 205 determines that the controlled UAVs 100 are on a potential collision course with one or more AOs.

The control measures and digital messaging module 250 is configured to communicate using radios 221 the proposed flight plans for the controlled UAVs 100 to the AOs 320 and/or air traffic management sites for coordination and approval. Such communications can be expanded to support pre-approval and flight clearances with appropriate agencies.

Figure 3:
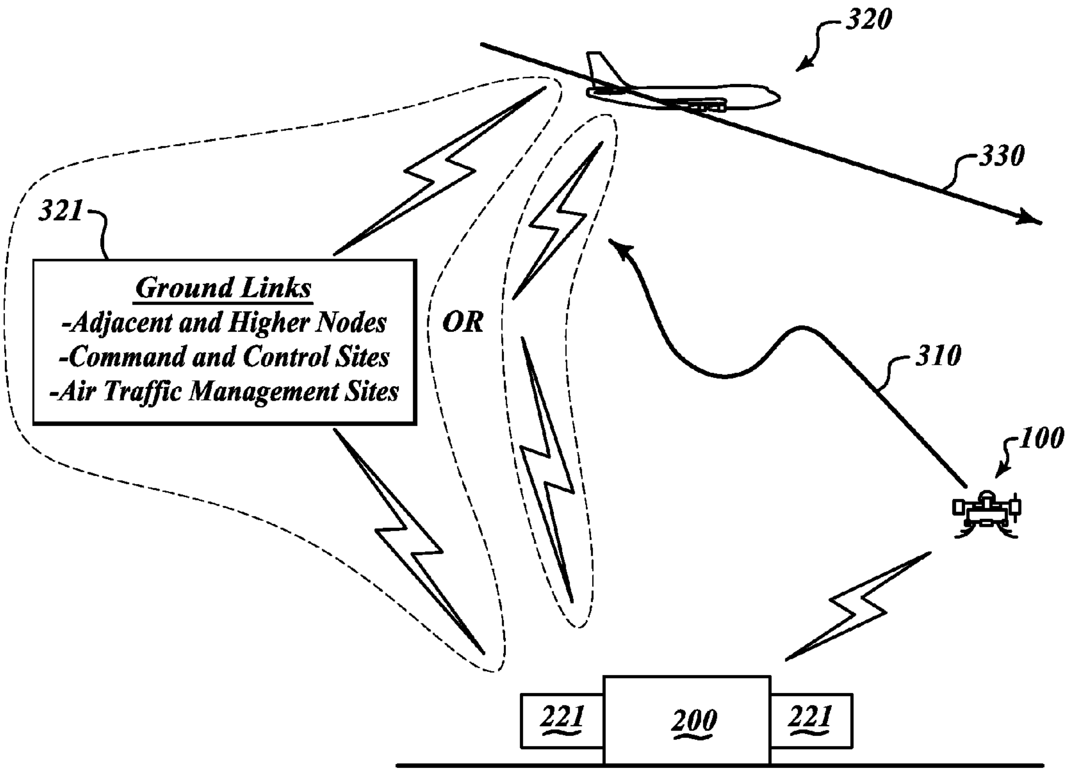
FIG. 3 depicts an example of a UAV flight plan that avoids interference with an aircraft.

FIG. 3 depicts an exemplary embodiment of a controlled UAV, such as UAV 100, using an updated flight plan received from station 200 to avoid an aircraft 320. UAV 100 is flying according to a pre-programmed UAV flight plan 310.

At point G, UAV 100 receives an updated flight plan from station 200 in response to station having determined that aircraft 320 is flying according to aircraft vector 330. UAV 100 may then follow the updated flight plan to avoid aircraft 320.

Figure 4:
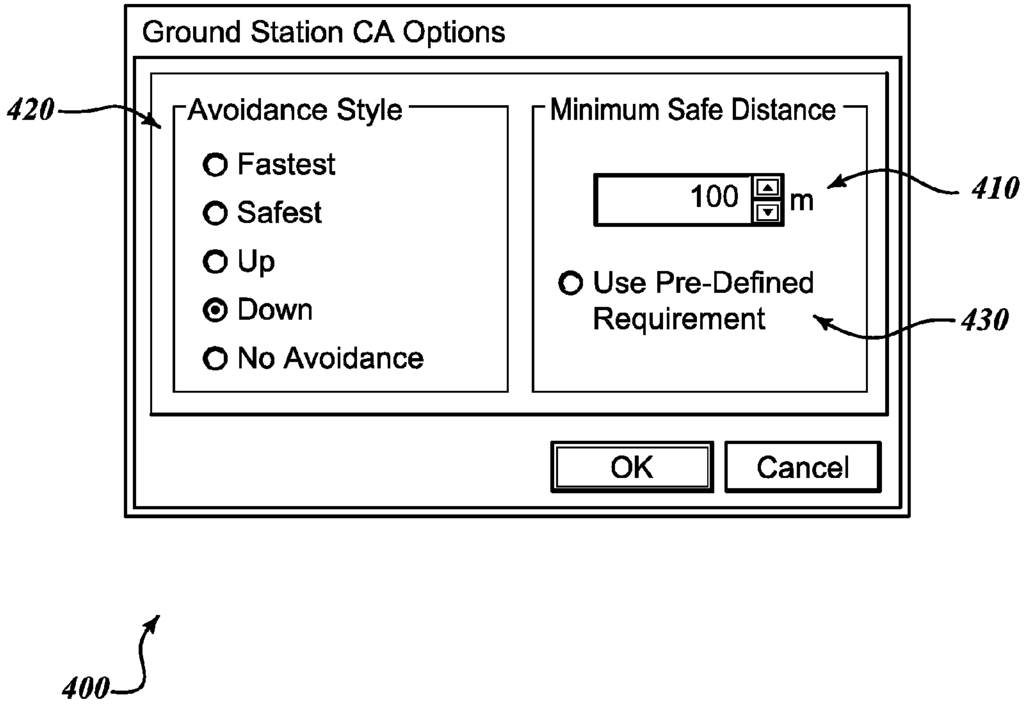
FIG. 4 depicts a user interface in accordance with an embodiment of the present invention.

As alluded to above herein, the characteristics of the updated flight plan may be configured by a user of the station 200 or pre-defined based on standards or regulations. As illustrated in FIG. 4, the station 200 may be configured to generate an alert to an associated display device via a user interface 400 that allows a user to select collision avoidance settings that the station can use to develop updated flight plans for controlled UAVs 100. A distance setting 410 allows the user to specify the minimum distance between a controlled UAV 100 and an AO that the controlled UAV should observe in following the updated flight plan. Additionally, a style setting 420 allows the user to specify a particular maneuver style that the controlled UAV 100 should observe in following the updated flight plan. Such maneuver styles may include Always Descend (Down), Always Ascend (Up), Safest (e.g., descend if below airborne object; ascend if above airborne object), Fastest (e.g., used if the UAV can ascend faster than it can descend, or vice versa). In addition, the system may use pre-defined settings such as from Federal Aviation Administration (FAA) regulations or other standard operating procedures in response to selection of setting 430.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A computer-readable medium including instructions that, when executed by a processor located at a ground station, enable the processor to perform steps for controlling an unmanned aerial vehicle (UAV) equipped with data representing a first UAV flight plan, the steps comprising:

receiving, at different times, data sets, each data set representing position of at least one aircraft;

estimating a flight path of the at least one aircraft based on a series of the received data sets;

calculating a second UAV flight plan to avoid the estimated flight path of the at least one aircraft, the second UAV flight plan being based on the data representing the first UAV flight plan and a first data set representing at least one flight path of the at least one aircraft;

transmitting data representing the second UAV flight plan to the UAV, notifying a controller of the UAV that certainty of position analysis for the at least one aircraft is reduced, when a data set is not included in the series of the received data sets.

2. The medium of claim 1, wherein the data sets represent the flight path of the at least one aircraft.

3. The medium of claim 1, wherein the second UAV flight plan is further based on a user-defined setting corresponding to a desired minimum distance between the UAV and the at least one aircraft.

4. The medium of claim 1, wherein the second UAV flight plan is further based on a user-defined setting corresponding to a predefined UAV maneuver.

5. The medium of claim 1, wherein the steps further comprise providing an alert to a user if the at least one flight path of at least one aircraft conflicts with the first UAV flight plan.

6. The medium of claim 1, wherein the steps further comprise:

estimating, based on at least one of the data sets received at a first time, a position of the at least one aircraft at a second time that is later than the first time;

calculating a third UAV flight plan to avoid the at least one flight path of the at least one aircraft, the third UAV flight plan being based on the position; and transmitting data representing the third UAV flight plan to the UAV.

7. The medium of claim 6, wherein the period length between the first time and the second time is user configurable.

8. The medium of claim 1, wherein the steps further comprise alerting a user that a second data set representing the at least one flight path of at least one aircraft, expected to be received at a time later than a time associated with a first data set, has not been received.

9. The medium of claim 6, wherein the steps further comprise displaying the position on a display device.

10. The medium of claim 1, wherein the steps further comprise transmitting the data representing the second UAV flight plan to the at least one aircraft.

11. A system, comprising:

an unmanned aerial vehicle (UAV) configured to be equipped with data representing a first UAV flight plan; and a ground station configured to control the UAV and operable to:

receive, at different times, data sets, each data set representing position of at least one aircraft, estimate a flight path of the at least one aircraft based on a series of the received data sets, calculate a second UAV flight plan to avoid the flight path of the at least one aircraft, the second UAV flight plan being based on the data representing the first UAV flight plan and a first data set representing at least one flight path of the at least one aircraft, and transmit data representing the second UAV flight plan to the UAV, notify a controller of the UAV that certainty of position analysis for the at least one aircraft is reduced, when a data set is not included in the series of the received data sets.

12. The system of claim 11, wherein the data sets represent the flight path of the at least one aircraft.

13. The system of claim 11, wherein the second UAV flight plan is further based on a user-defined setting corresponding to a desired minimum distance between the UAV and the at least one aircraft.

14. The system of claim 11, wherein the second UAV flight plan is further based on a user-defined setting corresponding to a predefined UAV maneuver.

15. The system of claim 11, wherein the ground station is further operable to provide an alert to a user if the at least one flight path of at least one aircraft conflicts with the first UAV flight plan.

16. The system of claim 11, wherein the ground station is further operable to:

estimate, based on at least one of the data sets received at a first time, a position of the at least one aircraft at a second time that is later than the first time;

calculate a third UAV flight plan to avoid the at least one flight path of the at least one aircraft, the third UAV flight plan being based on the position; and transmit data representing the third UAV flight plan to the UAV.

17. The system of claim 16, wherein the period length between the first time and the second time is user configurable.

18. The system of claim 11, wherein the ground station is further operable to alert a user that a second data set representing at least one flight path of at least one aircraft, expected to be received at a time later than a time associated with a first data set, has not been received.

19. The system of claim 16, wherein the ground station is further operable to display the position on a display device.

20. The system of claim 11, wherein the ground station is further operable to transmit the data representing the second UAV flight plan to the at least one aircraft.

* * * * *